Aug. 24, 1954  A. RAPPL  2,687,004
FLUID PRESSURE ACCESSORY SYSTEM FOR MOTOR VEHICLES
Filed Jan. 26, 1949  2 Sheets-Sheet 1
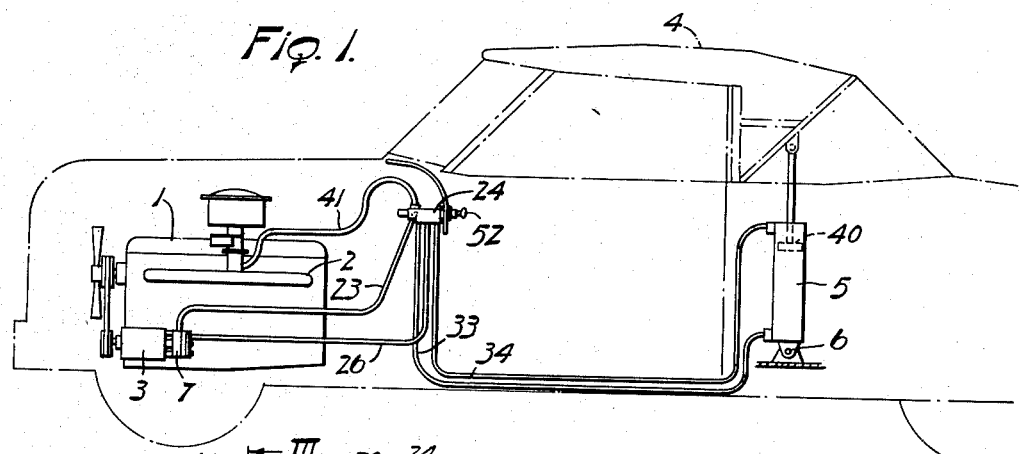
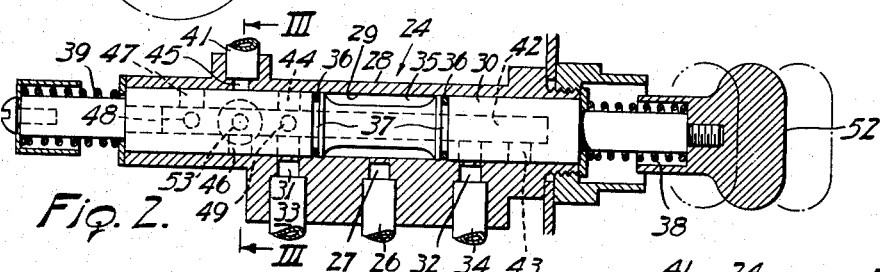
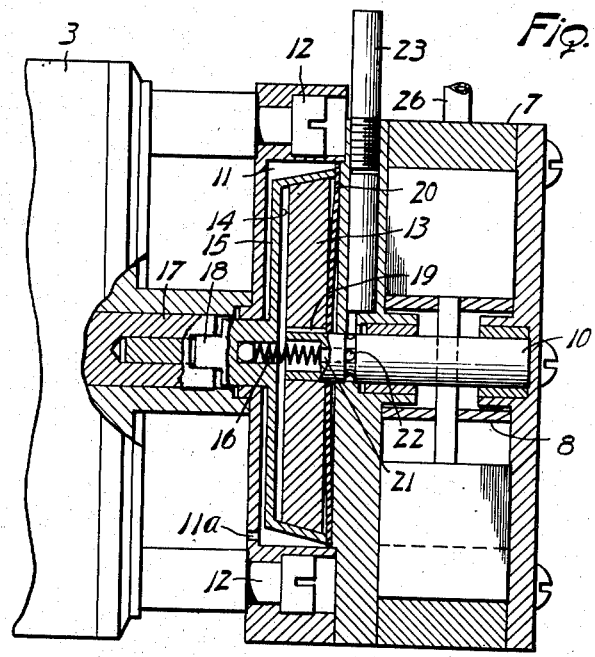
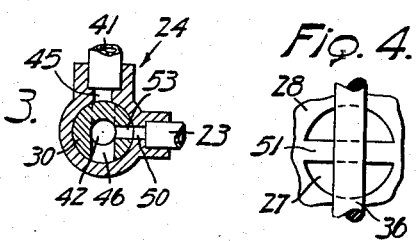
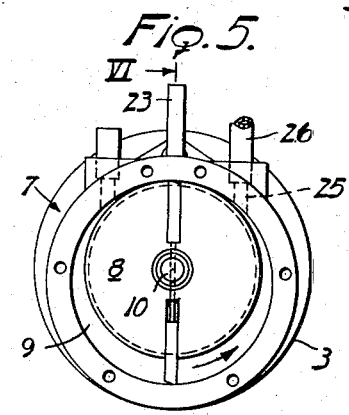
INVENTOR.
Anton Rappl
BY
Bean, Brooks, Buckley & Bean
ATTORNEYS Aug. 24, 1954  A. RAPPL  2,687,004
FLUID PRESSURE ACCESSORY SYSTEM FOR MOTOR VEHICLES
Filed Jan. 26, 1949  2 Sheets-Sheet 2
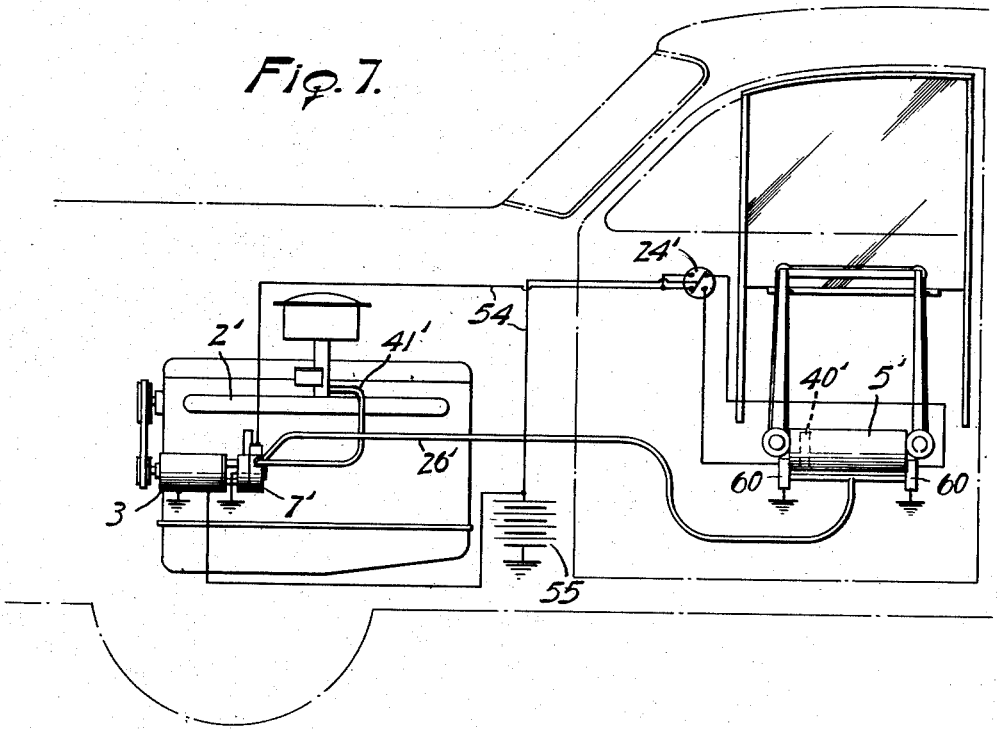
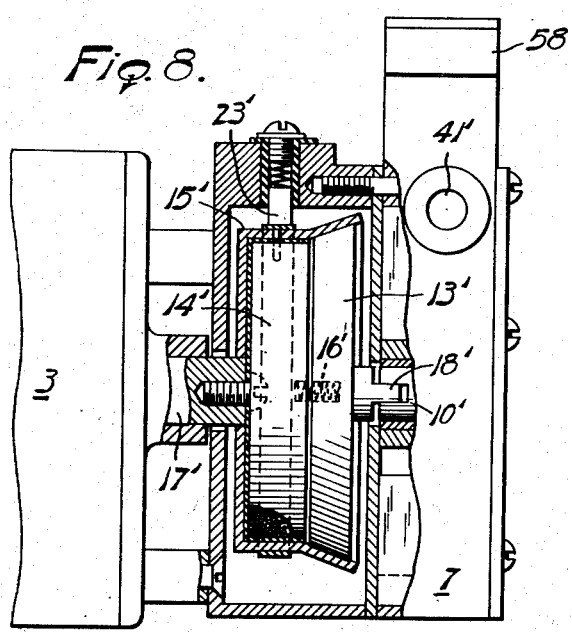
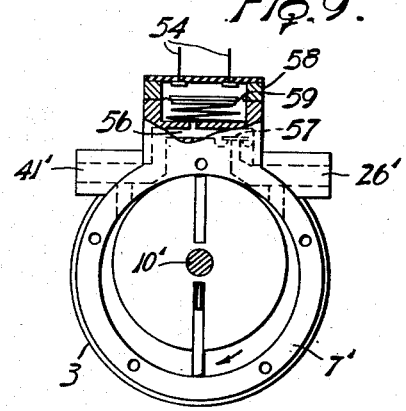
INVENTOR
Anton Rappl
BY
Bean, Brooke, Buckley & Bean.
ATTORNEYS Patented Aug. 24, 1954

2,687,004

UNITED STATES PATENT OFFICE 2,687,004

FLUID PRESSURE ACCESSORY SYSTEM FOR MOTOR VEHICLES

Anton Rappl, Eggertsville, N. Y., assignor to Trico Products Corporation, Buffalo, N. Y.

Application January 26, 1949, Serial No. 72,963

15 Claims. (Cl. 60—14)

This invention relates to the automotive accessory field and especially to a fluid actuated accessory mechanism. It has heretofore been proposed to employ fluid pressure, both positive as well as vacuum, in the actuation of accessories, but it has been difficult to find a satisfactory source of power for pressure generation and to connect it into the accessory system in a practical manner.

The present invention has for its object to provide an accessory system which is both practical and efficient and one wherein an adequate supply of fluid pressure is furnished to accomplish the accessory adjustment or operation expeditiously.

Again, the invention has for its aim to incorporate the system in, and associate it with, the power plant of the vehicle to enable the pressure generator being called into use, and also rendered inoperative, in a novel and definite manner and with minimum attention and effort on the part of the motorist.

The foregoing and other objects will manifest themselves as this description progresses, reference being made herein to the accompanying drawing, wherein Fig. 1 is a diagrammatic layout showing the invention as incorporated in an arrangement for raising and lowering the collapsible top of a convertible automobile;

Fig. 2 is a longitudinal section through the control valve;

Fig. 3 is a transverse section through the valve about on line III—III of Fig. 2;

Fig. 4 is a fragmentary view depicting the manner of the valve packing passing over a valve port;

Fig. 5 is an end elevation of the pump unit with the end plate of the pump housing removed;

Fig. 6 is a fragmentary section about on line VI—VI of Fig. 5;

Fig. 7 is a view similar to Fig. 1 depicting a modification;

Fig. 8 is a sectional view through the clutch of the modification; and

Fig. 9 is a view similar to Fig. 5 of the modification pump.

Referring more particularly to the drawing and especially to the preferred embodiment depicted in Figs. 1 through 6, the numeral 1 designates the power plant of the automobile having the intake manifold 2 as a source of suction and the electric generator 3. The accessory, such as a foldable top 4, is collapsed and extended by one or more fluid motors 5 pivotally mounted at 6 on the vehicle body.

According to the present invention the top adjusting motor is operated by the pressure difference between the manifold suction and the positive pressure furnished by an air pump 7. This pump may be of any suitable torque driven type, the one herein illustrated having a bladed rotor 8 rotating in a chamber 9 and fixedly supported by a drive shaft 10. The pump housing is also provided with a clutch compartment 11 and is detachably mounted on the generator frame by bolts 12. Within the clutch chamber is housed a friction cone or disk of suitable construction, that illustrated comprising a conical driven element 13 fitting within a conforming recess or chamber 14 of a driving element 15 but urged relatively apart by an interposed spring 16. The driving element 15 may be detachably coupled to the generator shaft 17 by a coupling 18 which has sufficient play to enable the driving clutch element being moved under the urge of spring 16. The driven clutch element is fixed upon the rotor shaft 10, as by key 19. The vacuum recess 14 is closed by a flexible sealing plate 20 and communicates with the source of vacuum through an axial bore 21 and the radial holes 22, in the rotor shaft, and from thence through a conduit 23 and a control valve 24. When communication is thus established by the valve, the pressure differential of the outside atmosphere will bring the driving clutch element 15 into driving contact with the driven element 13 and operate the pressure supply source 7 which has its outlet 25 connected by a conduit 26 to a pressure supply port 27 in the control valve. It will be seen that in the clutching movement the percentage change in volume in the air space surrounding the clutch mechanism within the compartment 11 is small, so that immediate equalization of the air pressure therein with the outside atmospheric pressure is not necessary for operation of the clutch as described. Accordingly, leakage between the parts forming the compartment 11 will ordinarily provide adequate venting thereof to the exterior, or, if desired, a separate vent 11a may be provided in the compartment wall.

The control valve comprises a housing 28 having a bore 29 therethrough and slidably receiving the cylindrical valving member 30. In addition to the pressure supply port 27, the valve housing is provided with two chamber ports 31 and 32 at opposite sides of the supply port, these two ports being connected to the top actuating motors 5, at the opposite ends of its chamber, by conduits 33 and 34. For bridging or connecting either chamber port with the supply port, the valve is formed with a reduced diameter to provide a connecting passage 35 which is rendered air tight by a pair of packing rings 36 fitting in peripheral grooves 37 in the body portion 30. A pair of springs 38 and 39 at the opposite ends of the valving member or body serve to centralize the normal position of the latter and to return the valve to such position when free. In this central position the supply port alone communicates with the passage 35, but when the valving member is pushed inwardly or pulled outwardly, the pressure supply port will be connected with a corresponding one of the two chamber ports for energizing the top adjusting motor 5 through the pressure differential acting upon its piston 40. With the pressure supply port joined to one chamber port, the companion chamber port will be vented or connected to the suction supply line 41 and the intake manifold 2 through a passage 42 in the valving member. This passage 42 is in the form of an axial bore having lateral ports 43 and 44 serving to connect the chamber port 32 to the suction supply port 45 whenever the valving member is pushed inwardly to connect the pressure supply port 27 to the chamber port 31. In its other operative position, the valving member has its pair of ports 46 and 47 connecting the chamber port 31 to the suction supply port 45 and pressure supply port joined to the companion chamber port 32.

By reason of this arrangement, the two pressure ports 27 and 45, one positive and the other vacuum, are selectively connectible to the top adjusting motor so as to either extend or contract the top as may be desired. Whenever the valve is in either operative position, the suction supply port 45 is also placed in communication with the vacuum recess 14 of the pump clutch through a line of connections consisting in either port 44 or 47, the bore 42, either one of the lateral ports 48 or 49 which registers with a housing port 50 and thence through the conduit 23, the radial holes 22 and the bore 21 in the pump shaft 10. Suction communication being thus established, the pressure differential will serve to operatively engage the two clutch elements 13 and 15 so that the constantly rotating generator shaft 17 will actuate the pump for generating the required super-atmospheric pressure in the pressure line 26. The movement of the valving member 30 will be facilitated by providing a spider support 51 across the housing ports 27, 31 and 32 for giving support to the packing rings 36 as they move across such ports.

From the foregoing it will be observed that the top may be readily and quickly extended to its operative position by pushing the valve knob 52 inwardly for providing a pressure differential between the superatmospheric and the subatmospheric pressures. Likewise, a pull on the valve knob 52 will transpose the suction and pressure connections to the motor 5 to quickly fold the top to its inoperative position. The source of pressure supply is normally inoperative, but becomes active in response to a simple manipulation of the control valve.

To insure a declutching of the pump from the constantly operating generator shaft the residual air pressure in the accessory motor 5 is utilized to advantage. For this purpose the valve bore 42 is further provided with a lateral port 53 which, when the valving member is in its neutral position, is placed in communication with the conduit 23 so that such pent-up residual pressure in the motor 5 will expend itself through the conduit 23 and upon the movable clutch element to disengage it from the companion element. Thus, the declutching operation for the pump will be performed pneumatically with or without the aid of the enclosed spring 16.

The top adjusting system is efficient and practical. As a rule top adjustment is effected seldom and therefore the system which is always subject to the actuation of the control valve, does not impose upon the power plant of the vehicle any burden during the long intervals of non-use of the system. But whenever it is desired to actuate the accessory, the engine driven pump will function as a definite source of positive pressure.

In the modification of Figs. 7, 8, and 9, the driven clutch element 13' is the movable one and is slidably keyed to the pump shaft 10' by a loose coupling 18'. The clutching force is applied electrically, as by an electromagnet 14' which is confined within the recess of the companion or driving clutch element 15' fixed to the generator shaft 17'. Through a brush 23' and the circuit connections 54 with a battery 55, the magnet is energized to attract the driven clutch element against the urge of spring 16' for rendering the clutch operative, a control switch 24' serving as a means for closing and opening the circuit. The pump 7' being thus clutched to the generator will operate as a source of low pressure with or without aid from the manifold.

The accessory, in this illustrated embodiment, is in the form of a window regulator having a fluid motor 5' with a piston 40'. The motor is suction operated and connected by a fluid line 26' to the pump and from thence by a line 41' to the intake manifold 2', a passage 56 with a check valve 57 shunting the pump chamber to enable the fluid motor to operate on the suction influence of the manifold when sufficient of itself. A suction responsive switch 58 has a spring pressed diaphragm 59 capable of closing the circuit 54 for the electromagnetic clutch when the manifold suction is insufficient for accessory performance. The suction line is opened to the fluid motor of the accessory through solenoidal valves 60 included in branch circuits with the control switch 24'. These valves 60 normally open the opposite ends of the motor chamber to the atmosphere and are selectively operable to open the source of suction, in a manner similar to that shown in Patent No. 2,528,145.

In both forms of the disclosure the pressure generator is normally arrested but is quickly clutched to the constantly running electric generator for being driven thereby when accessory operation is desired. The accessory system is practical and efficient and is instant in response to any demand. The pressure actuated clutch and the electrically actuated clutch are both placed under the manual control of the motorist and are both responsive to the pressure influence of the intake manifold for functioning.

The foregoing description has been given in detail without thought of limitation since the inventive principles involved are capable of assuming other physical embodiments without departing from the spirit of the invention and the scope of the appended claims.

What is claimed is:

1. A fluid accessory control system for a motor vehicle which has a source of negative pressure, a pump having a driven shaft and constituting a source of positive pressure, a clutch for operatively connecting the pump to a rotating shaft on the vehicle to be driven thereby, means operable by the negative pressure for rendering the clutch operative, a fluid actuated accessory connected to the source of negative pressure and to the pump for being operated by the pressure differential, and means manually controlling the clutch operating means.

2. A fluid pressure accessory system for a motor vehicle having a first source of pressure, a pressure pump constituting a second source of pressure, a normally inoperative clutch for connecting the pump to the power plant of the vehicle, pressure operable means for rendering the clutch operative, a fluid actuated accessory operably connected to the second source of pressure for operation thereby, and valve means operable to connect the pressure operable means to the first source of pressure to render the clutch operative.

3. A fluid pressure accessory system for a motor vehicle having a source of suction, comprising an accessory with a fluid motor, a pump providing an operating pressure for the motor, valve means manually operable for connecting the pump to the motor for actuating the accessory, a normally inoperative clutch having cooperating friction clutch elements one conical and the other having a recess conformably receiving the conical element, the clutch being operable to connect the pump to a rotating shaft on the vehicle to be driven thereby, suction actuated means under the control of the manual means to so clutch the pump, and means for expending the residual pressure in the fluid motor to declutch the pump.

4. A fluid pressure actuated accessory system for a motor vehicle having a rotating shaft, comprising a source of negative pressure, a pump constituting a source of positive pressure and having a driven shaft, an accessory having a motor chamber with a wall therein movable by fluid pressure, a normally inoperative clutch interposed between the two shafts and having a suction responsive member operable in a chamber to render the clutch operative to drive the pump, and valve means manually operable to open communication between the source of negative pressure and the clutch chamber to clutch the two shafts together and to establish communication between the source of positive pressure and the accessory chamber to actuate the accessory.

5. A pneumatic pressure actuated accessory system for a motor vehicle having a rotating shaft, comprising a source of negative pressure, a pump constituting a source of positive pressure and having a driven shaft, an accessory having a motor chamber with a wall therein movable by fluid pressure, a normally inoperative clutch interposed between the two shafts and having a suction responsive member operable in a chamber to actuate the clutch to drive the pump, and valve means manually operable to open communication between the source of negative pressure and the clutch chamber to clutch the two shafts together and connected to concurrently establish communication between both sources and the accessory chamber at opposite sides of its movable wall to provide an accessory actuating pressure differential.

6. A fluid pressure actuated accessory system for a motor vehicle having a rotating shaft, comprising a source of negative pressure, a pump constituting a source of positive pressure and having a driven shaft, an accessory having a motor chamber with a wall therein movable by fluid pressure, a normally inoperative clutch interposed between the two shafts and having a suction responsive member operable in a chamber to render the clutch operative to drive the pump, valve means manually operable to open communication between the source of negative pressure and the clutch chamber to clutch the two shafts together and to establish communication between the source of positive pressure and the accessory chamber to actuate the accessory, and means normally establishing communication between the accessory chamber and the clutch chamber when the clutch is inoperative to utilize the residual positive pressure in the clutch chamber for moving the suction responsive member to a shaft-declutching position.

7. A fluid pressure actuated accessory system for a motor vehicle, comprising an accessory having a fluid motor including a chamber and a piston movable back and forth therein, a source of positive pressure for the motor, a normally inoperative suction actuated clutch connectible to a source of negative pressure and embodying a chamber and a member therein responding to the suction to operatively clutch the source of positive pressure to a driving shaft on the vehicle to be operated thereby, valve means manually controlled to operatively connect the source of positive pressure to the motor chamber and the source of negative pressure to the clutch chamber to render the clutch operative, and means normally venting the motor chamber to the clutch chamber to expand the residual pressure in the motor chamber upon the clutch member when said valve means are inoperative.

8. A fluid pressure accessory system for a motor vehicle having a source of suction and a rotating shaft, a fluid actuated accessory, a pump operable to supply the accessory with an operating pressure, normally inoperative clutch means responsive to the source of suction and operating to connect the pump to the rotating drive, and manual means operable to connect the clutch means to the source of suction.

9. A fluid pressure accessory system for a motor vehicle having a source of suction, comprising an accessory with a fluid motor, a pump providing an operating pressure for the motor, valve means manually operable for connecting the pump to the motor for actuating the accessory, a normally inoperative clutch operable to connect the pump to a rotating shaft on the vehicle to be driven thereby, suction actuated means under the control of the manual means to so clutch the pump, and means for expending the residual pressure in the fluid motor to declutch the pump.

10. A fluid pressure accessory system for a motor vehicle having a source of suction, comprising an accessory with a fluid motor, a pump providing an operating pressure for the motor, valve means interposed between the pump and the motor for operatively applying the pressure to the latter, a suction operated clutch for connecting the pump to a driving part on the vehicle, and means under the control of the interposed means for connecting the source of suction to the clutch and concurrently to the fluid motor to increase the operating pressure differential in the latter.

11. A fluid pressure accessory system for a motor vehicle having a source of suction, comprising an accessory with a fluid motor, a pump providing an operating pressure for the motor, valve means interposed between the pump and the motor for operatively applying the pressure to the latter, a suction operated clutch for connecting the pump to a driving part on the vehicle, and means under the control of the interposed means for connecting the clutch to a source of suction and thereafter disconnecting the source and concurrently venting the fluid motor into the clutch to declutch the pump.

12. An accessory system for a motor vehicle having a rotating shaft, comprising a pump driven thereby for providing a positive accessory operating pressure, a pressure actuated clutch operatively connecting the pump to the shaft to be driven thereby, a fluid actuated accessory, means connecting the pump to the accessory for manual control of the latter, and means responsive to the manual means for venting the accessory to the clutch for declutching the pump when the accessory is inoperative.

13. An accessory system for a motor vehicle having a rotating shaft, comprising a pump driven thereby for providing a positive accessory operating pressure, a pressure actuated clutch operatively connecting the pump to the shaft to be driven thereby, a fluid actuated accessory, means providing a source of negative pressure, means operable to connect the two sources of pressure to the accessory for actuation of the latter, and means utilizing the negative pressure for controlling the clutch operation.

14. An accessory system for a motor vehicle having a rotating shaft, comprising a pump driven thereby for providing a positive accessory operating pressure, a clutch operatively connecting the pump to the shaft to be driven thereby, a fluid actuated accessory, means providing a source of negative pressure, means operable to connect the two sources of pressure to the accessory for actuation of the latter, and means utilizing one of the pressures for controlling the clutch operation, said clutch embodied means being in the form of an electromagnet.

15. An accessory system for a motor vehicle having a power plant with a rotating shaft, in combination, a pressure generator having a driven shaft, a fluid actuated accessory connected to the pressure generator, a clutch for connecting the two shafts in driving relation, a control for the accessory, and means responsive to the low pressure influence of the intake manifold of the power plant and subject to said control for rendering the clutch operative.

References Cited in the file of this patent

UNITED STATES PATENTS

| Number | Name | Date |
|---|---|---|
| 1,788,027 | May | Jan. 6, 1931 |
| 1,948,951 | Walker | Feb. 27, 1934 |
| 2,089,173 | Brown | Aug. 10, 1937 |
| 2,095,833 | Rockwell | Oct. 12, 1937 |
| 2,128,849 | Redfern | Aug. 30, 1938 |
| 2,331,603 | Falcon | Oct. 12, 1943 |
| 2,338,693 | Dolan | Jan. 4, 1944 |
| 2,397,814 | Seborg et al. | Apr. 2, 1946 |
| 2,397,937 | Hadekel | Apr. 9, 1946 |
| 2,419,374 | Shartle | Apr. 22, 1947 |

FOREIGN PATENTS

| Number | Country | Date |
|---|---|---|
| 674,526 | Great Britain | Jan. 26, 1950 |